Sept. 25, 1956　　　M. A. SUMMEROUR　　　2,764,268
LAWN MOWER PROPELLING MECHANISM

Filed July 23, 1953　　　　　　　　　　　　6 Sheets-Sheet 1

INVENTOR,
Marion A. Summerour.
BY
Hamilton & Hamilton,
Attorneys.

Sept. 25, 1956 M. A. SUMMEROUR 2,764,268
LAWN MOWER PROPELLING MECHANISM
Filed July 23, 1953 6 Sheets-Sheet 2
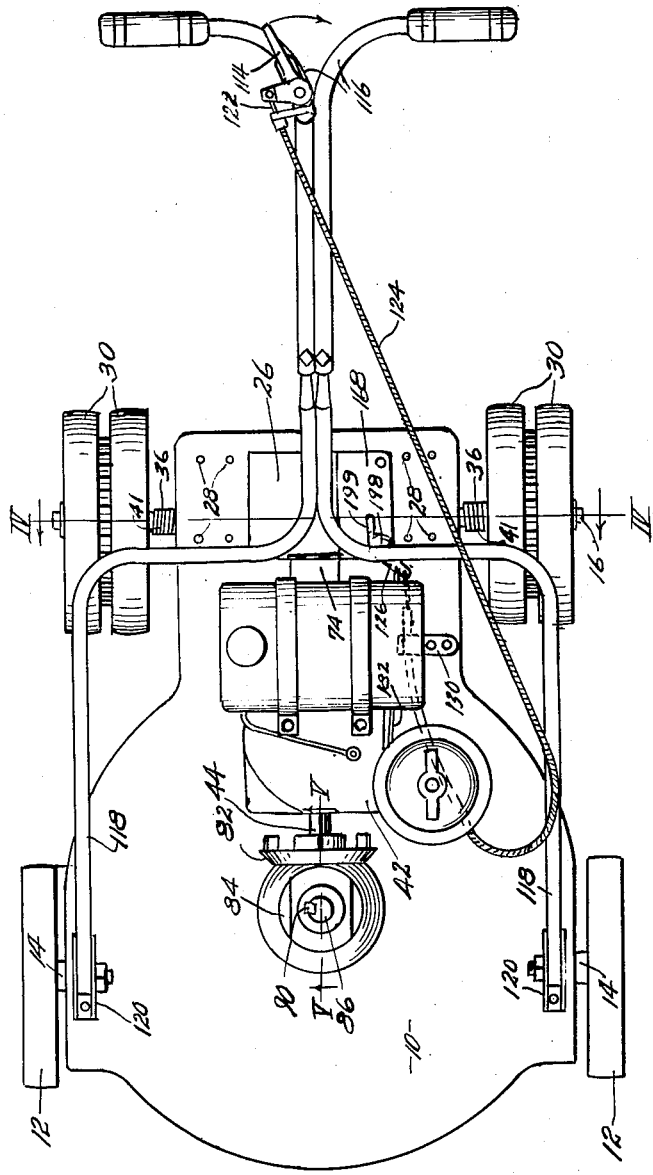
Fig. 2
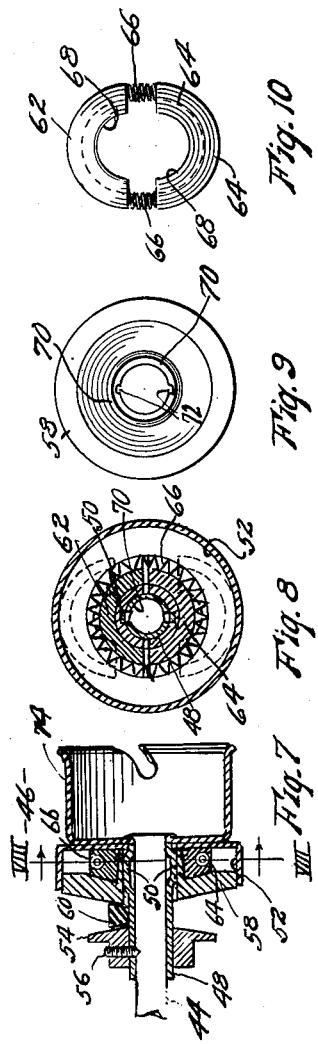
Fig. 10
Fig. 9
Fig. 8
Fig. 7
INVENTOR.
Marion A. Summerour.
BY Hamilton & Hamilton,
Attorneys.

INVENTOR.
Marion A. Summerour.
BY Hamilton & Hamilton.
Attorneys.

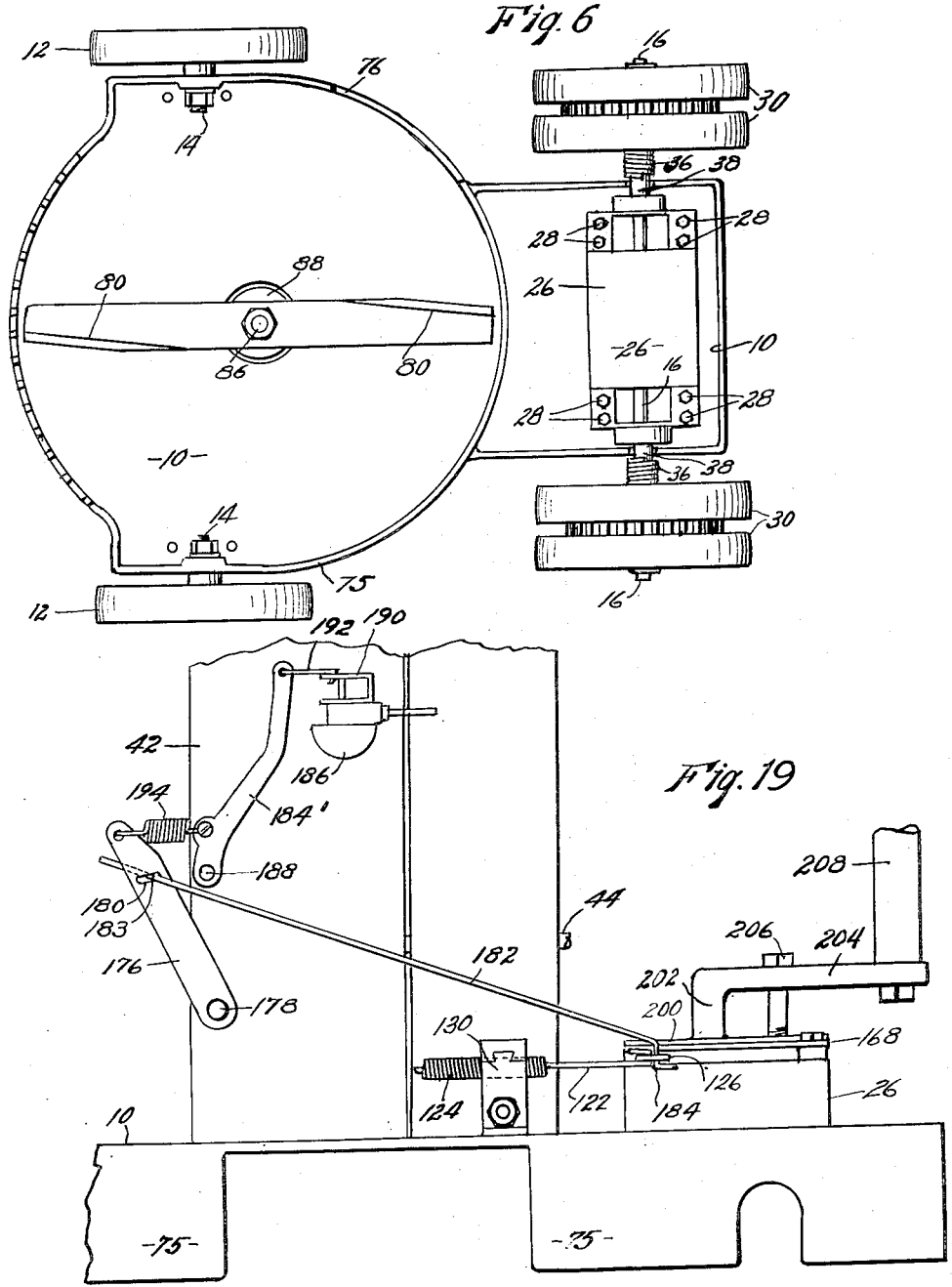

Sept. 25, 1956  M. A. SUMMEROUR  2,764,268
LAWN MOWER PROPELLING MECHANISM
Filed July 23, 1953  6 Sheets-Sheet 5

INVENTOR.
Marion A. Summerour.
BY
Hamilton & Hamilton,
Attorneys.

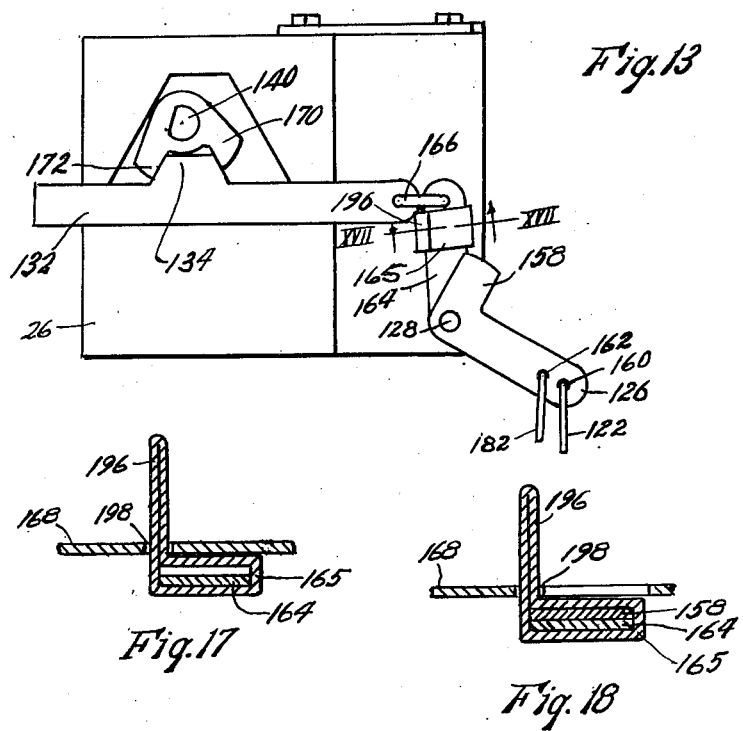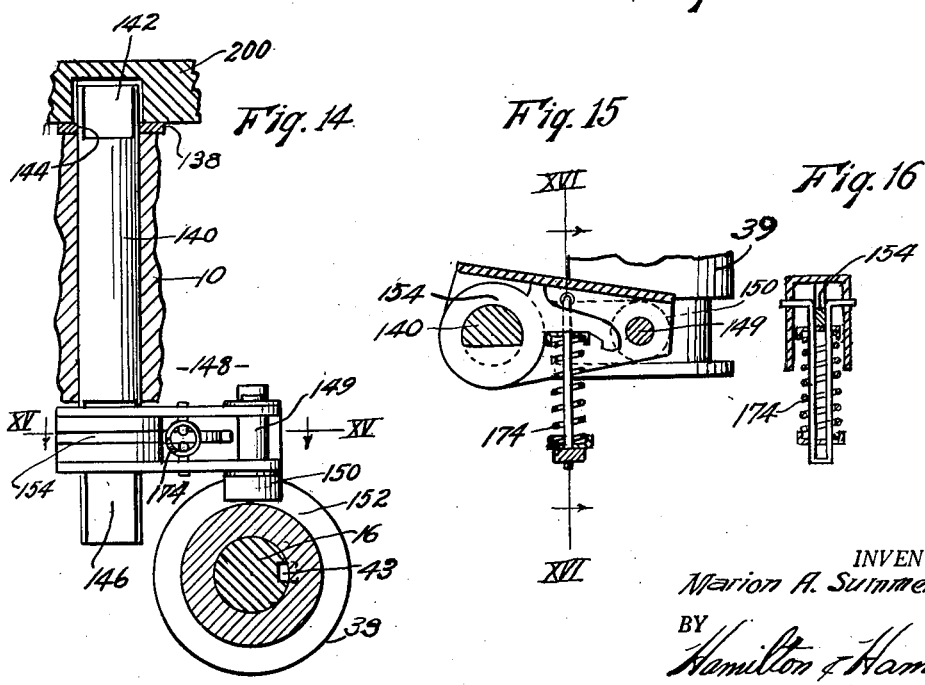

United States Patent Office 2,764,268
Patented Sept. 25, 1956

2,764,268

LAWN MOWER PROPELLING MECHANISM

Marion A. Summerour, Mission, Kans., assignor to National Metal Products Company, Inc., Kansas City, Mo., a corporation of Missouri Application July 23, 1953, Serial No. 369,783

3 Claims. (Cl. 192—.096)

This invention relates to improvements in a power lawn mower wherein the functioning of the parts are controlled by means of a lever member mounted on the handle bar in easy access of the operator.

The principal object of the present invention is the provision of overrunning clutch members associated respectively with the opposite side drive wheels of the mowers whereby to serve as a compensator to facilitate turning.

Other objects are simplicity and economy of construction, ease and efficiency of operation, and adaptation for use in mowing large and irregular lands.

With these objects in view as well as other objects which will appear during the course of the specification, reference will be had to the drawings wherein:

Fig. 2 is a plan view of the mower as shown in Fig. 1.

Fig. 5 is an enlarged sectional view taken on line V—V of Fig. 2.

Fig. 6 is an inverted plan view of Fig. 2, some parts omitted.

Fig. 7 is an enlarged sectional view taken on line VII—VII of Fig. 1 with the parts shown in the at rest position.

Fig. 8 is a cross sectional view taken on lines VIII—VIII of Fig. 7 with clutch parts shown in the driving position in dotted lines.

Fig. 9 is a face view of the floating cone member.

Fig. 10 is a face view of the clutch governor members showing them separated by centrifugal force.

Fig. 13 is a plan view of the gear box with the parts shown when the clutch member is locked, and accelerator is free to be operated.

Fig. 14 is an enlarged sectional view of a portion, certain of the clutch operating parts shown in Fig. 11.

Fig. 15 is a sectional view taken on line XV—XV of Fig. 14.

Fig. 16 is a sectional view taken on line XVI—XVI of Fig. 15.

Fig. 17 is an enlarged sectional view taken on line XVII—XVII of Fig. 13.

Fig. 18 is an enlarged sectional view taken on line XVIII—XVIII of Fig. 3.

Fig. 19 is a diagrammatical view showing the operation of accelerator.

Figure 1:
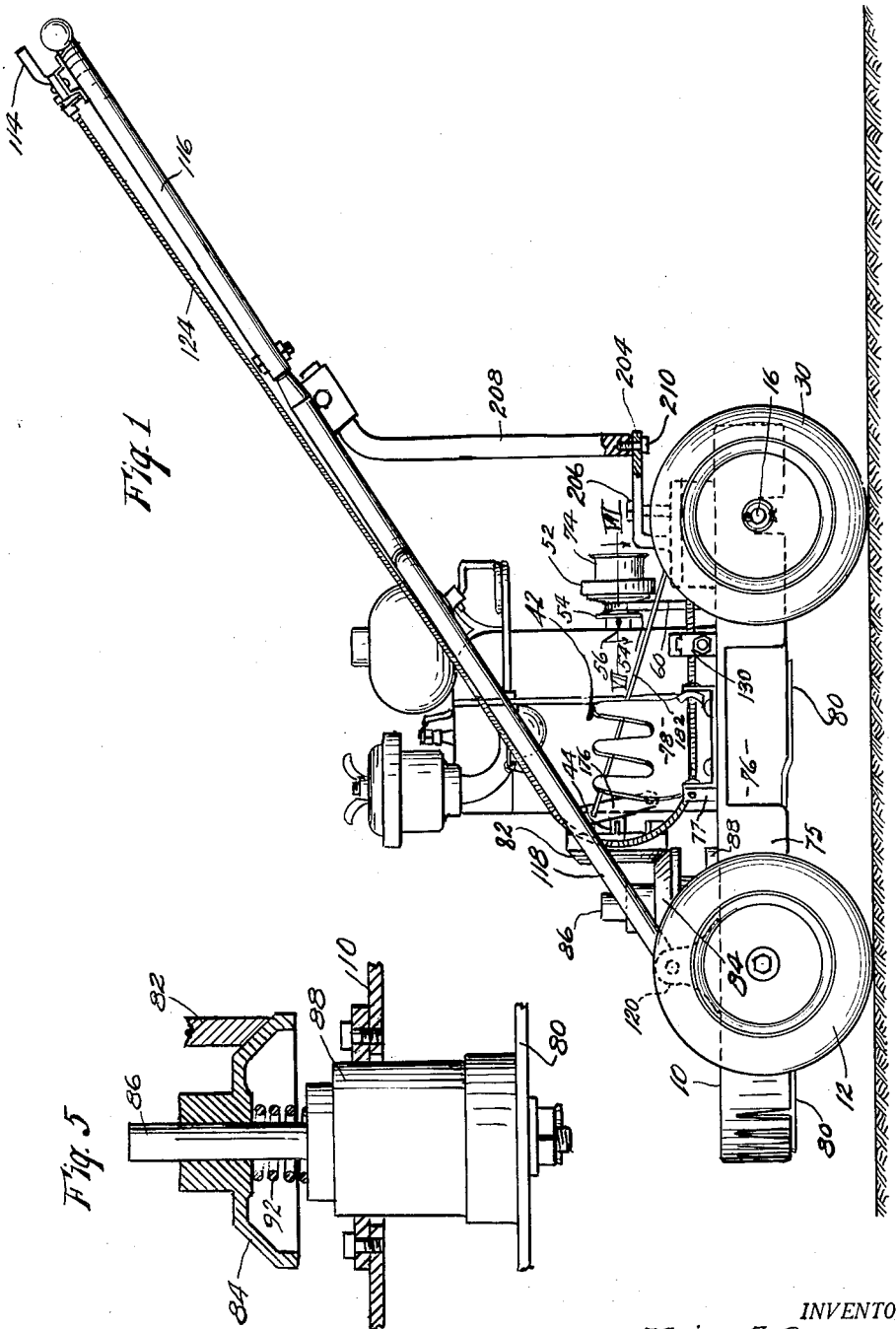
Fig. 1 is a side elevation of the power lawn mower with the parts shown in the operating position.

Throughout the several views like reference numerals refer to similar parts and the numeral 10 refers to a body housing member mounted at its front portion on a pair of spaced apart wheels 12, rotatably mounted on trunnions 14, fixed to said body housing. The rear end portion of said housing is provided with a transverse driving axle 16 which is rotatably mounted in a series of ball bearings 18, 20, 22, and 24, fixed in axial alignment in a gear housing 26. This gear housing is rigidly fixed to the underside of body housing 10 by means of bolts 28.

Double drive wheels 30 mounted on opposite ends of drive axle 16 are each provided at their inner sides with trunnion 32 to which is secured the outer end 34 of a helical coil 36. This coil is snugly wound about an elongated sleeve 38 which is splined on shaft 16 by means of a key 40, which permits of limited longitudinal movement of said sleeve on the shaft. Helical coil 36 has a series of tightly wound convolutions snugly fitted on sleeve 38 so that as the shaft 16 is driven in a direction tending to cause the coil to grip the sleeve, it drives the inside drive wheel as a turn is being made while the outside drive wheel will be permitted to slip back to compensate for the faster travel of said outside drive wheel. It is quite evident that these helical overrunning clutch members 41 serve to compensate for the different speeds of travel of the inside and outside wheels as the mower is moved about the land in the regular process of mowing.

Referring now to the driving means for shaft 16, reference will be had to Fig. 1 wherein the internal combustion engine 42 is mounted on body housing 10 and has a crank shaft 44. Crank shaft 44 carries an automatic clutch 46 made up of several parts and best shown in Figs. 7, 8, 9 and 10. A support tube 48 is fitted to receive crank shaft 44 and has a housing 52 suitable for receiving some of the clutch parts. The pulley end flange 54 fits over the inner end of tube 48 to receive set screw 56 to secure the sleeve, pulley and end flange 54 in fixed relation on crank shaft 44. A floating cone 58 is adapted to engage and disengage the driving belt 60 at correct speeds. The governor members 62 and 64 are joined together by means of the closed helical spring 66. The governors have semi-conical faces 68 which engage face 70 of the floating cone 58 to force it to engage belt 60 as the speed of the governors are increased to move them outwardly toward housing wall 52.

It will be noted that the inner walls 68 of governors 62 and 64 are substantially semi-conical to normally fit the conical hub portion 70 of floating cone 58. Key slots 72 are formed in hub 70 to receive the keys 50 formed in support tube 48 to permit relative sliding movement of the driving parts. Securely attached to tube 48 and housing 52 is a starting drum 74 about which a starting cord may be wound to start the engine by rotating the crank shaft 44.

The depending side wall 75 of body 10 is cut away at 76 to present a side opening for the release of the cuttings from the housing. A gate member 78 pivoted to a bracket 77 fixed to the upper surface of body 10 serves as a guard to protect the operator from the fast rotating blade 80 which is driven by crank shaft 44 through friction bevel wheel 82 mounted on crank shaft 44 which engages the bevel wheel 84 mounted on the vertically disposed shaft 86 mounted for rotation in bearing 88 fixed to body member 10. Bevel wheel 84 is splined to shaft 86 by means of key 90 which permits of relative sliding movement of the bevel wheel on said shaft as the bevel wheel 84 is urged against the driving bevel wheel 82 by means of tensioned coil spring 92.

Driving shaft 16 rotatably mounted in said series of bearings in gear housing 26 is provided with a freely rotatable worm gear 94 which operatively engages a worm 96 fixed to a transverse shaft 98 mounted in bearings 100. Shaft 98 extends outwardly beyond gear housing 26 and is provided with a belt wheel 102 fixed thereto by set screw 104. Belt wheel 102 is operatively engaged by belt 60 so that when engine 42 is running at a predetermined speed, clutch 46 will operate to drive belt 60 which in turn will rotate shaft 98 whereby worm gear 94 will be rotated.

Figure 4:
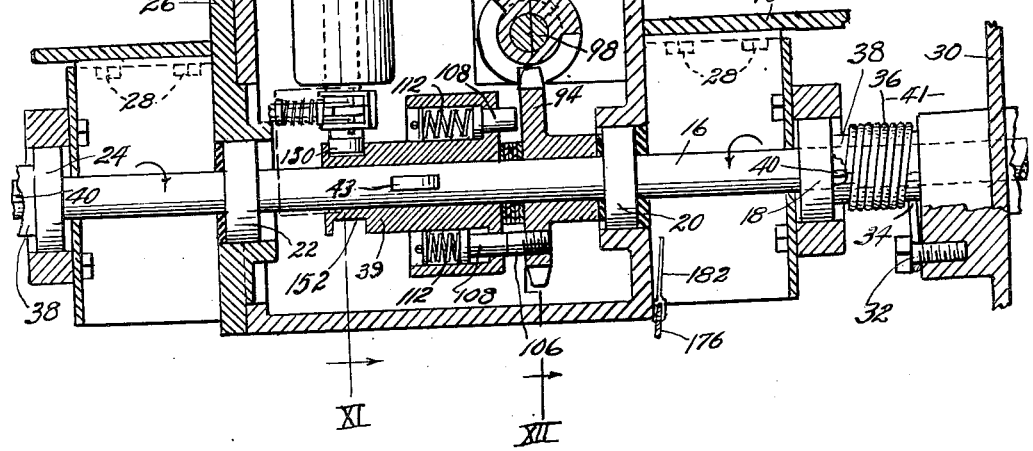
Fig. 4 is an enlarged sectional view taken on line IV—IV of Fig. 2.
Figure 11:
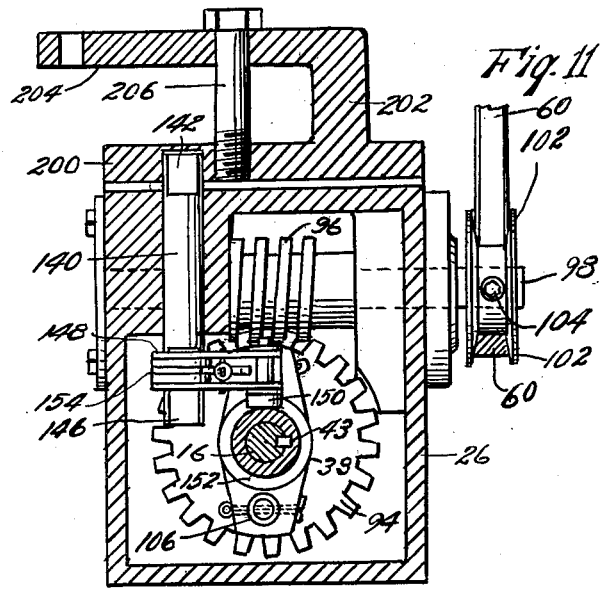
Fig. 11 is a sectional view taken on line XI—XI of Fig. 4.
Figure 12:
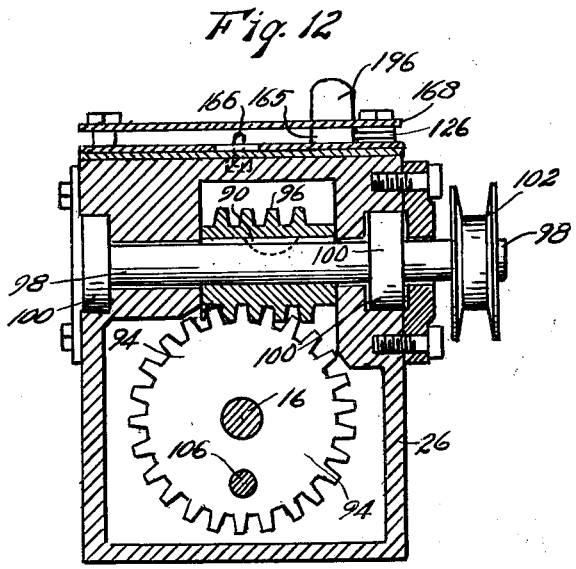
Fig. 12 is a sectional view taken on line XII—XII of Fig. 4 with some parts left in elevation.

Mounted on the body of worm gear 94 and extending outwardly therefrom is a driving lug 106 which is adapted to engage and drive spring loaded detents 108 mounted in sleeve 39 which is splined to shaft 16 by means of a key 43 whereby the detents 108 may be moved into and out of engagement with driving lug 106. To facilitate proper engagement of these clutch driving parts it will be apparent that a detent 108 might be moved to rest on top of driving lug 106 as shown in Fig. 4. Should this condition arise, it is quite apparent that due to the movement of the worm gear 94, the driving lug 106 will be moved in its orbit and the detent by the action of its spring 112, will be forced to the driving position as the parts continue to operate as described.

Figure 3:
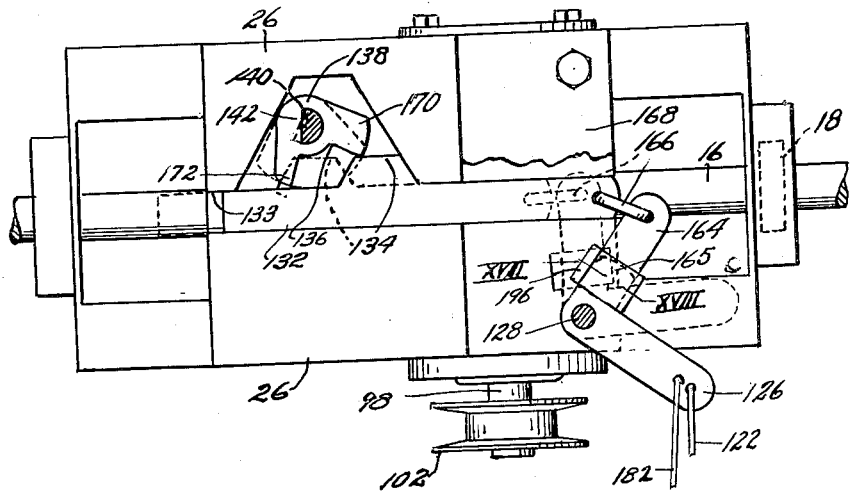
Fig. 3 is an enlarged plan view of the gear box and associated parts.

To control the driving of the mower and the speed of the engine, a hand operable lever 114 is provided on the handle bars 116 adjacent the operator. The bifurcated end portions 118 of the handle bars are pivotally mounted in brackets 120 fixed to the upper surface of body 10 and serve to steer the mower over the lawn. An operating wire 122 mounted in a connected sheath 124 is fixed to an operating lever 126 pivotally mounted on gear housing 26 by bolt 128. It will be noted that sheathing 124 is anchored at its lower end portion to bracket 130 which is fixed to body 10. As lever 114 is moved clockwise as shown by the arrow in Fig. 2, it will move lever 126 to the clutch engaging position as shown in Figs. 3 and 4.

Mounted in a shallow groove in the upper face of gear housing 26 is a cam bar 132 having a cam member 134 adapted to be normally positioned in a notch 136 formed in one side of operating cam 138. Operating cam 138 is slidably mounted on the upper end of a vertically disposed operating rod 140 from which a segment has been cut at 142 to snugly fit a hole 144 formed through said operating cam 138 so that as operating cam is oscillated it will always operate the rod 140 in like manner. The lower end portion of rod 140 is also segmentally cut away at 146 to receive the sleeve clutch member operating arm 148 carrying a roller 150 which operates in an annular groove 152 formed in the outer extermity of sleeve 39 to shift the clutch to and from the clutching position.

Due to the fact that during the clutch driving operation the clutching parts are tightly forced together and will not readily release, it has been found necessary to release the clutch by means of a tensioned spring, so that when the speed is gradually reduced, the clutch members will be released due to the action of the compressed spring. This result is obtained by the following mechanism, operating arm 148 is a radially extending arm of U-shaped cross-section which carries a vertically disposed pin 149 on which is fixed the roller 150 which operatively fits into groove 152. An operating arm 154 mounted in the U-shaped operating arm 148 is formed to snugly fit the formed lower end 146 of rod 140 so as to turn with the said rod at all times. When the arm 148 is operated to release the clutch, if the clutch does not immediately release, the clutch spring will be compressed to operate the clutch as soon as the tension is reduced between the clutching members 106 and 108.

Operating lever 126 is constructed so as to operate both the accelerator and the clutch or to just operate the accelerator and comprises an angled lever 126 having a short clamp arm 158 and the long lever arm 126 is provided with a pair of spaced apart holes 160 and 162 for receiving operating rods. A lever arm 164 also pivoted on bolt 128 just below lever 126 is adapted to be secured to the short arm 158 by means of a sleeve 165 slidably mounted on arm 164 and movable to disengage said short arm 158 whereby the operation of lever arm 126 will not move lever arm 164. It will be noted that the end portion of cam bar 132 is interconnected with the outer end of lever 164 by means of an open U-shaped connector 166. Referring to cover plate 168, it will be noted that it is formed and positioned to properly accommodate the lever parts as above described. Referring to Fig. 13, it will be noted that the inner leg 170 of operating cam 138 will be oscillated by the outward movement of cam member 134 and will be secured in said operated position as it rides on top of cam 134 for adjusting the accelerator rod 182 for regulating the speed of engine 42 without interfering with the clutching operation. As the operator returns lever 114 to the original starting point the leg 170 will contact cam 134 to move it against leg 172 to move the clutch member 108 out of operating engagement with lug 106. If at this point of the operation the clutch members 108 and 106 are not released, the arm 148 will stand still and the operating arm 154 will move outwardly to compress spring 174. As the speed of engine 42 is reduced sufficiently, the tensioned spring 174 will cause the arm 148 to move to declutch the driving parts.

Referring to Fig. 19 showing connection of engine control arm 176 with the operating lever 126, it will be noted that control arm 176 is pivoted at its lower extremity by pin 178 to engine 42, also arm 176 is provided adjacent its upper end with a transverse slot 180 through which a transversely offset portion 183 of a control rod 182 is inserted to oscillate arm 176 as said rod is moved by lever 126 to which the formed end portion 184 of rod 182 is fastened by passing through hole 162.

The connection between engine control arm 176 and carburetor 186 comprises an arm 184' pivoted at its lower end to engine 42 on pin 188 and at its upper end to an air control valve 190 by means of a link 192.

The engine-control arm 176 is connected at its upper end to the intermediate portion of arm 185 by means of a resilient spring connector 194, whereby the speed of the engine is properly regulated as the lever 114 is manually operated.

Sleeve 165 has an upstanding arm 196 by means of which it may be moved in slot 198 to connect and disconnect lever 164 with short arm 158. When sleeve 165 is moved into the narrow portion 199 of slot 198, the clutch will be secured in the engaged position.

A top plate 200 for gear housing 26 is provided with a standard 202 having a rearwardly extending arm 204 extending above plate 200 to receive pin 206 by means of which the tongue of a sulkey can be secured to the power driven mowing machine to carry the operator in convenient position to control lever 114 (sulkey not shown).

Referring to Fig. 1, it will be noted that arm 204 extends to the rear of plate 200 and is adapted to support the lower end of crutch 208 which is secured at its upper end to the lower side of handle bars 116. The lower end of crutch 208 is secured to arm 204 by means of screw 210, to facilitate proper control of the drive wheels 30.

The operation of this lawn mower is as follows. Engine 42 is energized to rotate crank shaft 44. Shaft 44 is interconnected to worm shaft 98 through belt tightener clutch 46 which when a predetermined engine speed is reached will tighten the belt 60 to operatively connect belt wheel 54 with belt wheel 102. Mounted on worm shaft 98 is a worm 96. Worm 96 operatively engages worm gear 94 which is mounted for free rotation on driving shaft 16. A pair of spaced apart driving wheels 30 are mounted on the opposite ends of shaft 16 by means of separately mounted over-riding clutches 41. Worm gear 94 has a driving lug 106 which is adapted to engage detents 108 to rotate sleeve 39 which is secured to shaft 16 by a key 43, whereby drive shaft 16 will be rotated at a speed corresponding to the speed of the engine, to drive the mower.

When shaft 16 is driven in the direction indicated by the arrows in Fig. 4, the spring 36 will hug the associated sleeve 38 to drive it in the same direction. During a turning operation, these over-riding clutches operate to drive the slowest running inside drive wheel 30 while the other clutch permits outside fast running wheel to over-run the drive shaft.

When the lever 126 is freed from arm 164 by sliding loop 165 off of leg 158 as shown in Fig. 13, the operator can adjust lever 114 to pivot lever 126, thus regulating the motor speed through throttle rod 182, without affecting the clutch operating slide 132. This is done when it is desired to propel the mower manually, as when mowing in close and cramped areas. When lever 126 is connected to arm 164 by sliding loop 165 over leg 158, as in Fig. 3, then operation of lever 126 will operate not only throttle rod 182, but also will pivot arm 164 to operate clutch slide 132 as previously described. It will be noted that during the initial movement of slide 132, during which time the clutch cam 138 is operated to engage the clutch, the throttle rod offset 183 is moving through slot 180 of throttle control lever 176 without pivoting the same. Thus the clutch may be engaged before the throttle is advanced, although both are controlled by the same lever. Also, with the clutch engaged as indicated in Fig. 3, the throttle may still be adjusted by pivoting lever 125 without disengaging the clutch, so long as cam leg 170 rides on the top of cam 134 of slide 132.

As lever 126 turns, it engages the clutch members 106 and 108, and simultaneously advances the throttle. However, at this time the motor speed is low, and centrifugal clutch 46 consequently disengaged. As the motor picks up speed due to the advance of the accelerator, clutch 46 operates to tighten belt 60 gradually, which then drives the propelling shaft 16.

What I claim as new and desire to protect by Letters Patent is:

1. A lawn mower comprising a frame, drive wheels supporting said frame, an engine having an adjustable throttle fixed on said frame, a driving connection between said engine and said drive wheels, a manually operable clutch in said driving connection, operating means for said clutch including a lever pivotally connected with said frame, said lever being adjustable to disengage or engage said clutch, and to secure said clutch in the engaged position, and having a period of lost motion in said clutch securing position, and connecting means between said lever and said throttle whereby said throttle is regulated by movement of said lever, said period of lost motion permitting control of said throttle by pivoting said lever while said clutch is secured in its engaged position.

2. A lawn mower comprising a frame, drive wheels supporting said frame, an engine having an adjustable throttle fixed on said frame, a driving connection between said engine and said drive wheels, a manually operable clutch in said driving connection, operating means for said clutch including a lever pivotally connected with said frame, said lever being adjustable to disengage or engage said clutch, and to secure said clutch in the engaged position, and having a period of lost motion in said clutch securing position, and connecting means between said lever and said throttle whereby said throttle is regulated by movement of said lever, said connecting means providing a period of lost motion between said lever and said throttle, said last named period of lost motion being traversed as said lever moves toward its clutch engaging position, whereby said clutch may be engaged before said throttle is advanced, and the lost motion between said lever and said clutch permitting control of said throttle by pivoting said lever while said clutch is secured in the engaged position.

3. The structure as recited in claim 2 with the addition of a centrifugally operated clutch in the driving connection between said engine and said drive wheels and operable to be engaged as said engine attains a predetermined speed of operation.

References Cited in the file of this patent

UNITED STATES PATENTS

| | | |
|---|---|---|
| 1,838,700 | Meyer | Dec. 29, 1931 |
| 2,564,586 | Smith et al. | Aug. 14, 1951 |
| 2,582,177 | Swisher et al. | Jan. 8, 1952 |
| 2,587,343 | Lind | Feb. 26, 1952 |
| 2,620,612 | De Eugenio | Dec. 9, 1952 |